(12) United States Patent
Xiao et al.

(10) Patent No.: US 11,342,654 B2
(45) Date of Patent: May 24, 2022

(54) BASE STATION ANTENNA, SWITCH, AND BASE STATION DEVICE

(71) Applicant: HUAWEI TECHNOLOGIES CO., LTD., Guangdong (CN)

(72) Inventors: Weihong Xiao, Dongguan (CN); Zhiqiang Liao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/158,674

(22) Filed: Jan. 26, 2021

(65) Prior Publication Data
US 2021/0151864 A1 May 20, 2021

Related U.S. Application Data

(63) Continuation of application No. PCT/CN2019/097142, filed on Jul. 22, 2019.

(30) Foreign Application Priority Data

Jul. 26, 2018 (CN) .......................... 201810835771.0

(51) Int. Cl.
*H01Q 1/24* (2006.01)
*H01Q 3/26* (2006.01)
(Continued)

(52) U.S. Cl.
CPC ........... *H01Q 1/246* (2013.01); *H01Q 3/2605* (2013.01); *H01Q 3/40* (2013.01); *H01Q 21/0006* (2013.01); *H01Q 21/29* (2013.01); *H04W 88/085* (2013.01)

(58) Field of Classification Search
CPC ........ H01Q 1/246; H01Q 1/50; H01Q 3/2605; H01Q 3/40; H01Q 3/24; H01Q 21/0006; H01Q 21/29; H01Q 21/061; H01Q 21/24
See application file for complete search history.

(56) References Cited

U.S. PATENT DOCUMENTS

| 4,847,625 A | * | 7/1989 | Dietrich | ............... | H01Q 9/0457 343/700 MS |
| 4,903,033 A | * | 2/1990 | Tsao | ..................... | H01Q 15/244 343/700 MS |

(Continued)

FOREIGN PATENT DOCUMENTS

| CN | 101652898 A | 2/2010 |
| CN | 102760975 A | 10/2012 |

(Continued)

OTHER PUBLICATIONS

Office Action issued in Chinese Application No. 201810835771.0 dated Jun. 5, 2020, 9 pages.

(Continued)

*Primary Examiner* — Lam T Mai
(74) *Attorney, Agent, or Firm* — Fish & Richardson P.C.

(57) ABSTRACT

This application provides examples of a base station antenna, a switch, and a base station device. A connection status between an output port and an input port of a horizontal-dimensional feeding network is changed by using a switch of the horizontal-dimensional feeding network. In different connection statuses, quantities of input ports that are connected to a plurality of output ports of the horizontal-dimensional feeding network are different. The input port of the horizontal-dimensional feeding network is in communication with an antenna port to form a transceiver channel. In this case, a quantity of transceiver channels, of the horizontal-dimensional feeding network, formed in each connection status is different. Therefore, the quantity of transceiver channels supported by the base station device can be changed by using the base station antenna without a need of replacing the base station antenna.

21 Claims, 8 Drawing Sheets

(51) Int. Cl.
*H01Q 3/40* (2006.01)
*H01Q 21/00* (2006.01)
*H01Q 21/29* (2006.01)
*H04W 88/08* (2009.01)

(56) References Cited

U.S. PATENT DOCUMENTS

| | | | |
|---|---|---|---|
| 9,780,437 B2 * | 10/2017 | Knox | H01Q 9/0435 |
| 10,998,945 B1 * | 5/2021 | Baligh | H04B 7/0617 |
| 11,089,595 B1 * | 8/2021 | Frigon | H04W 72/046 |
| 2009/0224990 A1 | 9/2009 | Cezanne et al. | |
| 2018/0102593 A1 * | 4/2018 | Gong | H01Q 21/064 |
| 2018/0287255 A1 * | 10/2018 | Zimmerman | H01Q 3/32 |
| 2019/0372221 A1 * | 12/2019 | Wu | H04B 17/21 |
| 2020/0328787 A1 * | 10/2020 | Wang | H04B 7/0608 |

FOREIGN PATENT DOCUMENTS

| | | |
|---|---|---|
| CN | 103874076 A | 6/2014 |
| CN | 104183895 A | 12/2014 |
| CN | 106792748 A | 5/2017 |
| CN | 107230837 A | 10/2017 |
| EP | 2816664 A2 | 12/2014 |
| EP | 3553885 A1 | 10/2019 |
| JP | H11234023 A | 8/1999 |
| WO | 2014008797 A1 | 1/2014 |
| WO | 2018119928 A1 | 7/2018 |

OTHER PUBLICATIONS

PCT International Search Report and Written Opinion issued in International Application No. PCT/CN2019/097142 dated Oct. 28, 2019, 14 pages (with English translation).

Barba et al., "A Switchable Multiple Beam Antenna for GSM-UMTS Base Stations in Planar Technology," IEEE Transactions on Antennas and Propagation, vol. 54, No. 11, Nov. 2006, 8 pages.

Extended European Search Report issued in European Application No. 19842342.8 dated Jul. 28, 2021, 10 pages.

\* cited by examiner

BASE STATION ANTENNA, SWITCH, AND BASE STATION DEVICE

CROSS-REFERENCE TO RELATED APPLICATIONS

This application is a continuation of international Application No. PCT/CN2019/097141, filed on Jul. 22, 2019, which claims priority to Chinese Patent Application No. 201810835771.0, filed on Jul. 26, 2018. The disclosures of the aforementioned applications are hereby incorporated by reference in their entireties.

TECHNICAL FIELD

This application relates to the field of wireless communications technologies, and in particular, to a base station antenna, a switch, and a base station device.

BACKGROUND

Transceiver channels supported by a base station device develop from a "dual-TX dual-RX structure" to a "four-TX four-RX structure", and further develop from the "four-TX four-RX structure" to an "eight-TX eight-RX structure". With an increase in a quantity of transceiver channels supported by the base station device, communication performance of the base station device is improved. It can be predicted that as a mobile communications network continuously evolves, the quantity of transceiver channels supported by the base station device will continue to change.

The quantity of transceiver channels supported by the base station device depends on a structure of a horizontal-dimensional feeding network in a base station antenna of the base station device. The horizontal-dimensional feeding network is configured to feed a radiating element of the base station antenna in a horizontal dimension. However, in the current technologies, the structure of the horizontal-dimensional feeding network cannot be changed once it is delivered. In this case, the quantity of transceiver channels supported by the base station device can be changed only by replacing the base station antenna with a base station antenna that has a horizontal-dimensional feeding network with a different structure.

SUMMARY

This application provides a base station antenna, a switch, and a base station device, to resolve a technical problem in an existing solution that a quantity of transceiver channels supported by the base station device can be changed only by replacing a base station antenna of the base station device.

According to a first aspect, an embodiment of this application provides a base station antenna. A connection status between an output port and an input port of a horizontal-dimensional feeding network can be changed by using a switch of the horizontal-dimensional feeding network, and in different connection statuses, quantities of input ports that are connected to a plurality of output ports of the horizontal-dimensional feeding network are different. The input port is in communication with an antenna port to form a transceiver channel. In this case, a quantity of transceiver channels, of the horizontal-dimensional feeding network, formed in each connection status is different. Therefore, the quantity of transceiver channels supported by the base station device can be changed by using the base station antenna, without a need of replacing the base station antenna, thereby reducing labor and costs required for replacing the base station antenna.

According to a second aspect, an embodiment of this application provides another base station antenna. A connection status between an output port and an input port of a horizontal-dimensional feeding network can be changed by using a switch of the horizontal-dimensional feeding network, and in different connection statuses, quantities of input ports that are connected to a plurality of output ports of the horizontal-dimensional feeding network are different. The input port is in communication with an antenna port through a vertical-dimensional feeding network, to form a transceiver channel. In this case, a quantity of transceiver channels, of the horizontal-dimensional feeding network, formed in each connection status is different. Therefore, the quantity of transceiver channels supported by a base station device can be changed by using the base station antenna.

For example, in the base station antennas shown in the first aspect and the second aspect, each input port can be connected to one fixed input coupled strip line apparatus of the switch, each output port is connected to one fixed output coupled strip line apparatus of the switch, and each moving coupled strip line apparatus of the switch includes at least one input end and at least one output end. The at least one input end is connected to the at least one output end. In each connection status, each fixed output coupled strip line apparatus is connected to the output end of the moving coupled strip line apparatus, and each input end of each moving coupled strip line apparatus connected to the fixed output coupled strip line apparatus is connected to one fixed input coupled strip line apparatus.

For example, in the base station antennas shown in the first aspect and the second aspect, the moving coupled strip line apparatuses of each switch can include at least two types of moving coupled strip line apparatuses, and sums of quantities of input ends and quantities of output ends of different types of moving coupled strip line apparatuses are different. The switch can move different types of first moving coupled strip line apparatuses and second moving coupled strip line apparatuses, to disconnect an output end of at least one first moving coupled strip line apparatus from a target fixed output coupled strip line apparatus, to connect each target fixed output coupled strip line apparatus to an output end of at least one second moving coupled strip line apparatus, and to connect each input end of the at least one second moving coupled strip line apparatus to a fixed input coupled strip line apparatus, where a total quantity of input ends of the at least one first moving coupled strip line apparatus is different from a total quantity of input ends of the at least one second moving coupled strip line apparatus, and the target fixed output coupled strip line apparatus is at least one of all the fixed output coupled strip line apparatuses.

For example, in the base station antennas shown in the first aspect and the second aspect, the first moving coupled strip line apparatuses and the second moving coupled strip line apparatuses may be set in the following manner: If a quantity of output ends of each first moving coupled strip line apparatus is 1 and a quantity of input ends is 1, a quantity of output ends of each second moving coupled strip line apparatus is 2 and a quantity of input ends is 1; or a quantity of output ends of each second moving coupled strip line apparatus is 2 and a quantity of input ends is 2. Alternatively, if a quantity of output ends of each first moving coupled strip line apparatus is 2 and a quantity of input ends is 1, a quantity of output ends of each second moving coupled strip line apparatus is 1 and a quantity of input ends is 1; or a quantity of output ends of each second moving coupled strip line apparatus is 2 and a quantity of input ends is 2. Alternatively, if a quantity of output ends of each first moving coupled strip line apparatus is 2 and a quantity of input ends is 2, a quantity of output ends of each second moving coupled strip line apparatus is 1 and a quantity of input ends is 1; or a quantity of output ends of each second moving coupled strip line apparatus is 2 and a quantity of input ends is 1.

For example, in the base station antennas shown in the first aspect and the second aspect, at least one of a plurality of radiating elements included in an antenna array is a dual-polarized radiating element.

For example, in the base station antennas shown in the first aspect and the second aspect, a quantity of columns of antenna arrays is greater than or equal to 4.

For example, in the base station antennas shown in the first aspect and the second aspect, each vertical-dimensional feeding network is a phase-shift network, used to adjust a downtilt angle of a beam.

According to a third aspect, an embodiment of this application further provides a base station device, including the base station antenna in any one of the first aspect and the possible designs of the first aspect or any one of the second aspect and the possible designs of the second aspect. The base station device further includes a plurality of transceivers TRXs. The plurality of TRXs are connected to one radio interface of the base station device.

For example, in the base station device shown in the third aspect, the TRX can be a remote radio unit RRU.

DESCRIPTION OF EMBODIMENTS

Embodiments of this application provide a base station antenna, including a plurality of antenna ports, a horizontal-dimensional feeding network, a plurality of vertical-dimensional feeding networks, and a plurality of columns of antenna arrays. The horizontal-dimensional feeding network includes a plurality of input ports, a plurality of output ports, and a switch. The plurality of input ports are in one-to-one connection with the plurality of antenna ports. Each output port is connected to one vertical-dimensional feeding network. A connection status between the output port and the input port of the horizontal-dimensional feeding network can be changed by using the switch of the horizontal-dimensional feeding network, and in different connection statuses, quantities of input ports that are connected to the plurality of output ports of the horizontal-dimensional feeding network are different. The input port is in communication with an antenna port to form a transceiver channel. In this case, a quantity of transceiver channels, of the horizontal-dimensional feeding network, formed in each connection status is different. Therefore, the quantity of transceiver channels supported by a base station device can be changed by using the base station antenna.

The following explains terms used or possibly used in this application:

1. "At least one" means one or more, that is, including one, two, three, and more.

2. "A plurality of" means two or more, that is, including two, three, four, and more.

3. Connection refers to coupling, including direct connection or indirect connection through other components to implement electrical communication.

The following describes the embodiments of the present invention in detail with reference to accompanying drawings. First, a scenario to which the base station antenna provided in the embodiments of the present invention is applied is described. Then, a specific structure of the base station antenna provided in the embodiments of the present invention is described.

The base station antenna provided in the embodiments of this application can be applied to a mobile communications system. The mobile communications system here includes but is not limited to: a global system for mobile communications (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, a future 5th generation (5th Generation, 5G) system, or new radio (New Radio, NR).

Figure 1:
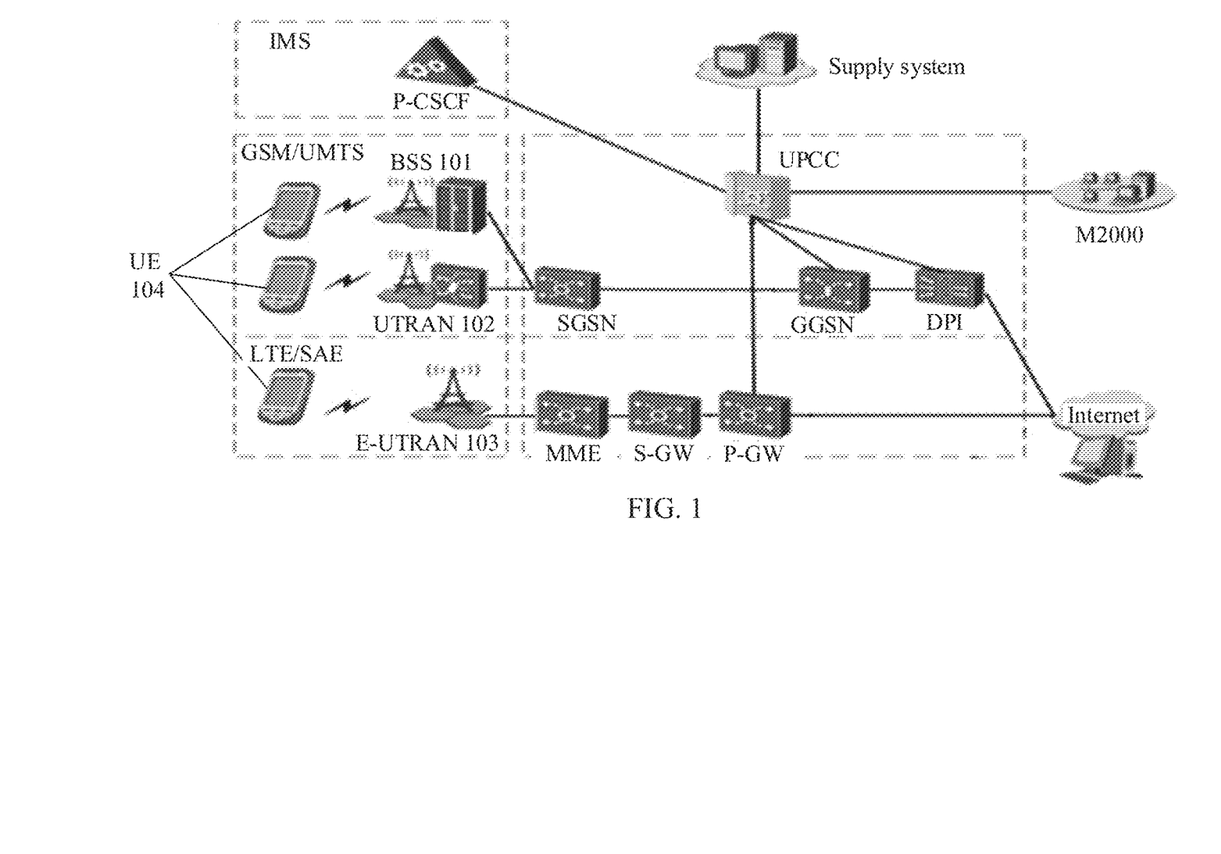
FIG. 1 is a schematic architectural diagram of a wireless network according to an embodiment of this application.

For example, the base station antenna provided in the embodiments of this application may be applied to a wireless network system shown in FIG. 1. The base station antenna may be applied to a base station subsystem (base station subsystem, BBS) 101, a universal terrestrial radio access network (UMTS terrestrial radio access network, UTRAN, UMTS, Universal Mobile Telecommunications System, universal mobile telecommunications system) 202, or an evolved universal terrestrial radio access network (Evolved Universal Terrestrial Radio Access, E-UTRAN) 203, and is configured to perform cell coverage of a radio signal, to implement connection between UE 204 and a radio network radio frequency end.

The base station antenna involved in the embodiments may be located in a radio access network device, to implement signal receiving and sending. Specifically, the radio access network device may include but is not limited to a base station 200 shown in FIG. 2. The base station 200 may be a base transceiver station (Base Transceiver Station, BTS) in a GSM or CDMA system, may be a NodeB (NodeB, NB) in a WCDMA system, may be an evolved NodeB (Evolutional NodeB, eNB or eNodeB) in an LTE system, or may be a radio controller in a cloud radio access network (Cloud Radio Access Network, CRAN) scenario. The base station 200 may alternatively be a relay station, an access point, a vehicle-mounted device, a wearable device, and a base station in a future 5G network, a base station in a future evolved PLMN network, or the like, for example, a new radio base station. This is not limited in the embodiments of this application. The base station 200 may provide radio cell signal coverage, and serve a terminal device by using one or more cells.

Figure 2:
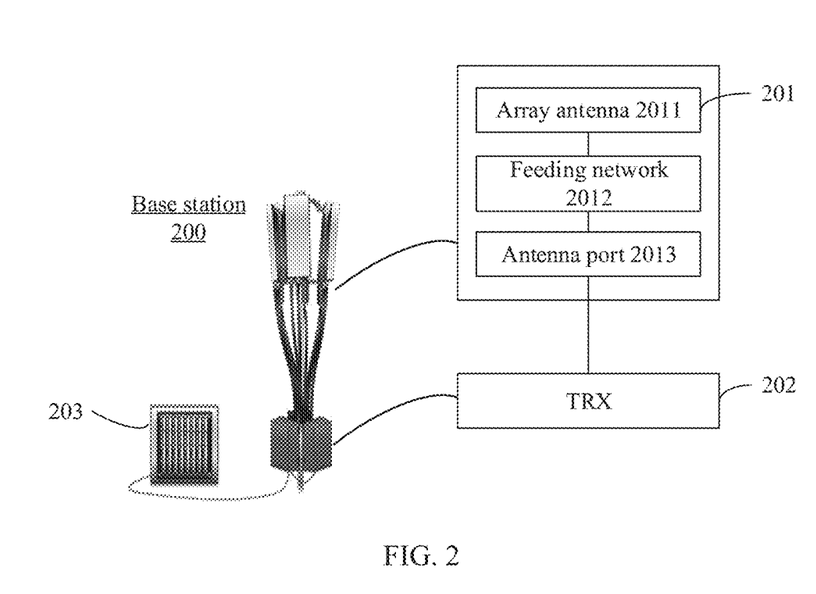
FIG. 2 is a schematic architectural diagram of a base station device according to an embodiment of this application.

As shown in FIG. 2, a possible structure of the base station 200 may include a base station antenna 201, a transceiver (TRX) 202, and a baseband processing unit 203. The TRX is connected to an antenna port of the base station antenna 201. In this case, the antenna port may be configured to receive a to-be-sent signal sent by the TRX 202, and may be used by a radiating element of the base station antenna 201 to radiate a to-be-sent signal, or the antenna port may send, to the TRX 202, a signal received by the radiating element.

During implementation, the TRX 202 may be a radio remote unit (radio remote unit, RRU), and the baseband processing unit 203 may be a baseband unit (base band unit, BBU).

The baseband unit may be configured to process a to-be-sent baseband optical signal and transmit the baseband optical signal to the RRU, or receive a to-be-received baseband signal sent by the RRU (that is, a baseband signal obtained after the RRU performs conversion processing on a radio frequency signal received by the base station antenna 201 in a signal receiving process) and process the received baseband signal. The RRU may convert a to-be-transmitted baseband optical signal sent by the BBU to a to-be-sent radio frequency signal (including performing necessary signal processing such as signal amplification on the baseband signal). Then, the RRU may send the to-be-sent radio frequency signal to the base station antenna 201 by using the antenna port, so that the radio frequency signal is radiated by using the base station antenna 201. Alternatively, the RRU may receive a to-be-received radio frequency signal sent by an antenna port of the base station antenna 201, convert the to-be-received radio frequency signal to a to-be-received baseband signal, and send the to-be-received baseband signal to the BBU.

The base station antenna 201 may include an array antenna 2011, a feeding network 2012, and an antenna port 2013. The array antenna 2011 may include radiating elements arranged according to a geometric rule, and is configured to receive and/or radiate radio waves. An output end of the feeding network 2012 is connected to the array antenna 2011, and is configured to feed each radiating element in the array antenna 2011, so that the array antenna 2011 radiates a plurality of beams, and different beams may cover different ranges. The feeding network 2012 may include a phase shifter, which is configured to change a radiation direction of a radiated beam of the array antenna 2011. The feeding network 2012 may include a vertical-dimensional feeding network and a horizontal-dimensional feeding network. The vertical-dimensional feeding network may be configured to adjust a beam width and a vertical-dimensional beam direction of a beam. The horizontal-dimensional feeding network may be configured to perform horizontal-dimensional beam forming on a transmitted signal, and may be configured to change a beam width, shape, and beam direction of a beam. An input end of the feeding network 2012 is connected to the antenna port 2013, to form a transceiver channel. Each antenna port 2013 corresponds to one transceiver channel, and the antenna port 2013 may be connected to the TRX 202.

During implementation, each base station antenna 201 may have a plurality of antenna ports 2013 and a plurality of TRXs 202. Each antenna port 2013 is connected to one TRX 202, and the baseband processing unit 203 may be connected to one or more TRXs 202.

Figure 3:
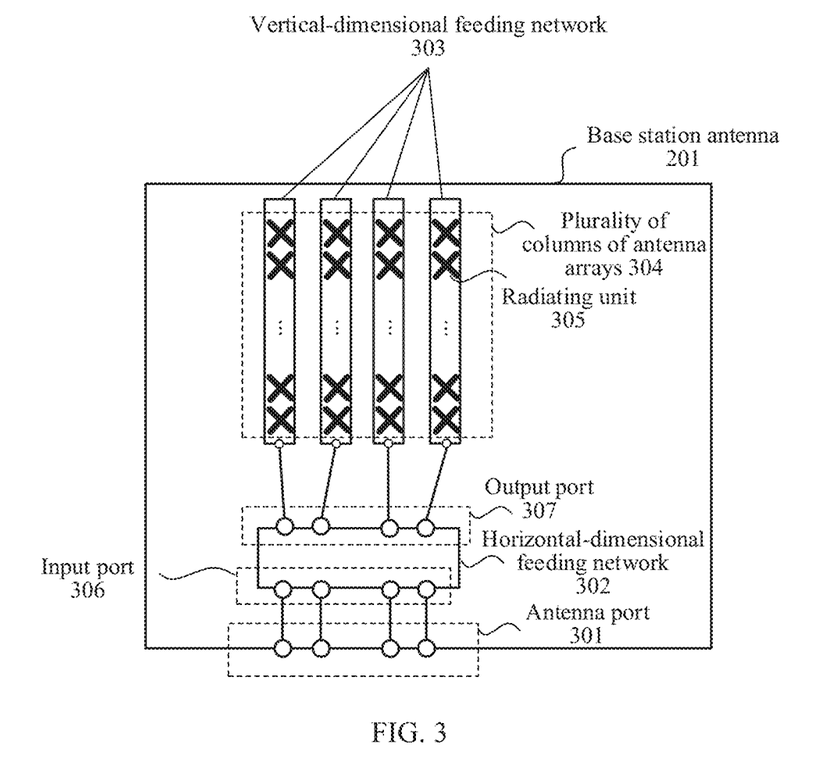
FIG. 3 is a schematic structural diagram of a base station antenna according to an embodiment of this application.

The base station antenna 201 provided in this embodiment of this application may have a structure shown in FIG. 3. The base station antenna 201 may include a plurality of antenna ports 301, a horizontal-dimensional feeding network 302, a plurality of vertical-dimensional feeding networks 303, and a plurality of columns of antenna arrays 304. Each column of antenna arrays include a plurality of radiating elements 305, and each vertical-dimensional feeding network feeds each radiating element 305 in a column of antenna arrays 304.

The horizontal-dimensional feeding network 302 includes a plurality of input ports 306, a plurality of output ports 307, and a switch (not shown in FIG. 3). During specific implementation, the horizontal-dimensional feeding network 302 may be further configured to adjust a horizontal-dimensional azimuth of a beam radiated by the radiating element 305.

The switch is configured to switch a connection status between the output port 307 and the input port 306, in each connection status, each output port 307 is connected to at least one input port 306, and quantities of input ports 306 connected to the plurality of output ports 307 in any two connection statuses are different.

The plurality of input ports 306 are in one-to-one connection with the plurality of antenna ports 301, and the antenna port 301 is configured to: send a signal to the input port 306 connected to the antenna port 301, and receive a signal sent by the input port 306 connected to the antenna port 301.

Each output port 307 is connected to one vertical-dimensional feeding network 303. During specific implementation, the vertical-dimensional feeding network 303 may be a phase-shift network used to adjust a downtilt angle of a beam radiated by the radiating element 305, and the network may include at least one phase shifter. During implementation, a plurality of output ends of the vertical-dimensional feeding network 303 may be in one-to-one connection with radiating elements 305 in a column of antenna arrays 304, and an input end of the vertical-dimensional feeding network 303 is connected to one output port 307.

Based on the foregoing structure, a quantity of antenna ports 301 in communication with the antenna arrays 304 in the base station antenna 201 may be changed by changing the connection status between the output port 307 and the input port 306 in the horizontal-dimensional feeding network 302, and therefore, a quantity of transceiver channels that can be actually used by the base station antenna 201 is changed. This means that the quantity of transceiver channels that can be used by the base station antenna 201 can be changed without replacing the base station antenna 201. Further, each antenna port 201 in communication with the antenna array 204 may be connected to a transceiver TRX, so that a quantity of TRXs used in a base station device may be changed based on a use requirement of transceiver channels, without a need of replacing the base station antenna, where the TRX may be an RRU.

Figure 4:
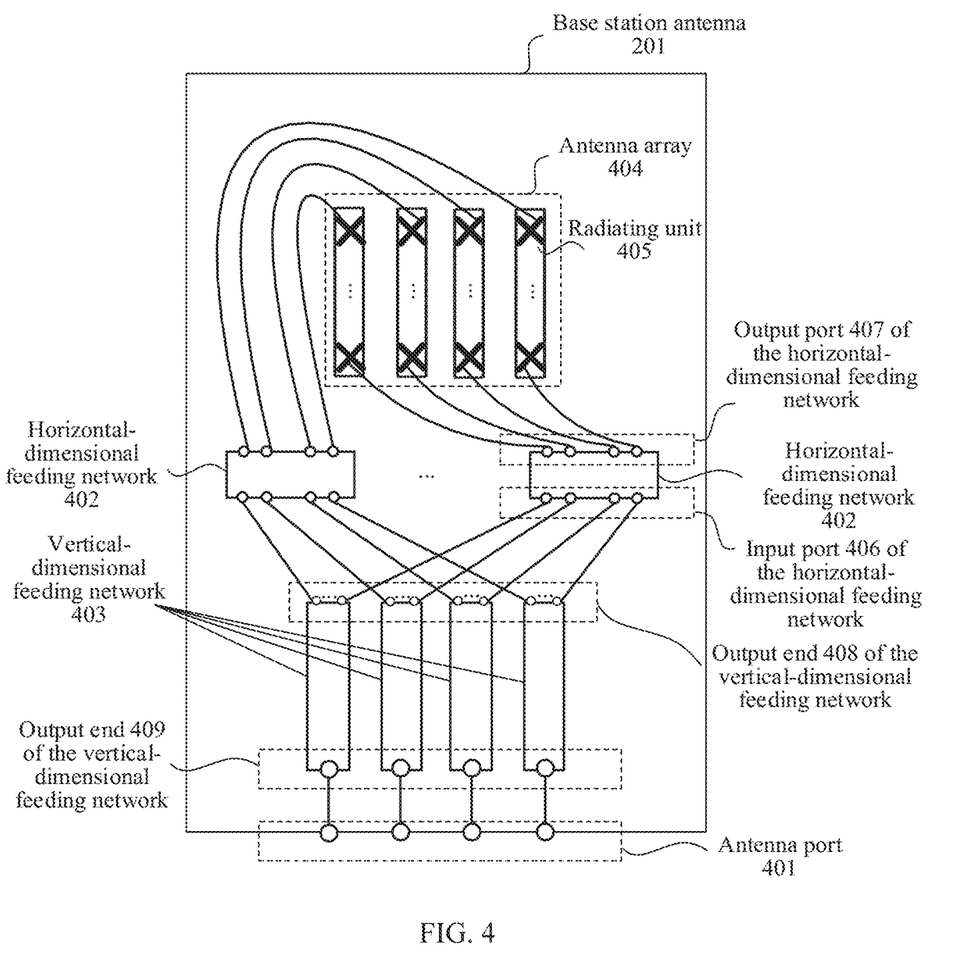
FIG. 4 is another schematic structural diagram of a base station antenna according to an embodiment of this application.

As shown in FIG. 4, in a structure of another base station antenna 201 provided in an embodiment of this application, the base station antenna 201 includes a plurality of antenna ports 401, a plurality of horizontal-dimensional feeding networks 402, a plurality of vertical-dimensional feeding networks 403, and a plurality of rows of antenna arrays 404, where each row of antenna arrays include a plurality of radiating elements 405.

Each horizontal-dimensional feeding network 402 includes a plurality of input ports 406, a plurality of output ports 407, and a switch (not shown in FIG. 4), where the switch is configured to switch a connection status between the output port 407 and the input port 406 of the horizontal-dimensional feeding network 402, in each connection status, each output port 407 is connected to at least one input port 406, and quantities of input ports 406 connected to the plurality of output ports 407 in any two connection statuses are different;

the plurality of output ports 407 are in one-to-one connection with a plurality of radiating elements 405 in one row of antenna arrays 404;

each input port 406 is connected to an output end 408 of a vertical-dimensional feeding network 403; and Input ends 409 of the plurality of vertical-dimensional feeding networks 403 are in one-to-one connection with the plurality of antenna ports 401.

Based on the foregoing structure, a quantity of vertical-dimensional feeding networks 403 in communication with the radiating elements 405 in the base station antenna 201 may be changed by switching the connection status between the output port 407 and the input port 406 in the horizontal-dimensional feeding network 402, and therefore, a quantity of antenna ports 401 in communication with the radiating elements 405 is changed. As the quantity of antenna ports 401 in communication with the radiating elements 405 determines a quantity of transceiver channels that can be actually used by the base station antenna 201, based on the foregoing structure, the quantity of transceiver channels that can be used by the base station antenna 201 can be changed without replacing the base station antenna 201. Further, each antenna port 401 in communication with the radiating element 405 may be connected to a transceiver TRX, so that a quantity of TRXs used in a base station device may be changed based on a use requirement of transceiver channels, without a need of replacing the base station antenna, where the TRX may be an RRU.

During implementation, to improve a radiation effect of the base station antenna, at least one of the following settings may be performed on the base station antenna 201 shown in FIG. 3 or FIG. 4:

setting at least one of the plurality of radiating elements included in the antenna array as a dual-polarized radiating element;

setting a quantity of horizontal-dimensional feeding networks included in the base station antenna 201 to 2; and setting a quantity of the columns of antenna arrays 204 to be greater than or equal to 4.

Figure 5:
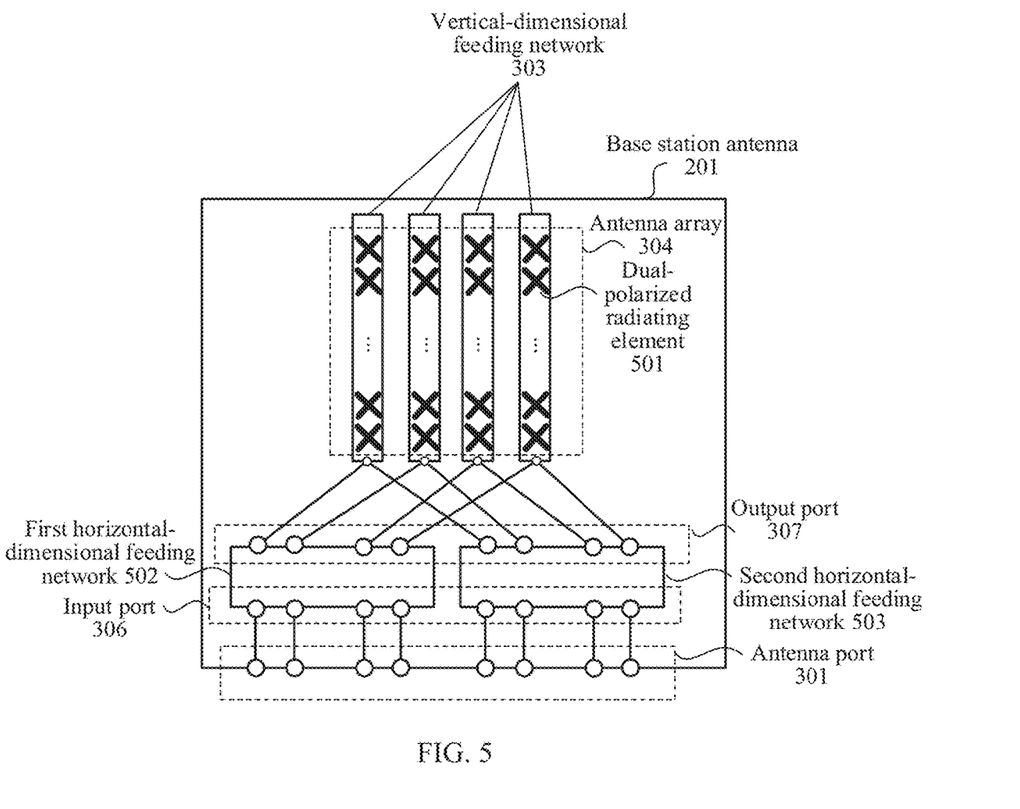
FIG. 5 is another schematic structural diagram of a base station antenna according to an embodiment of this application.

As shown in FIG. 5, during implementation, an antenna array radiating element in the base station antenna 201 may be a dual-polarized radiating element. In the base station antenna 201 having a dual-polarized radiating element 501, each vertical-dimensional feeding network is connected to two horizontal-dimensional feeding networks: a first horizontal-dimensional feeding network 502 and a second horizontal-dimensional feeding network 503. Specifically, the quantity of the columns of antenna arrays 304 is 4. All radiating elements may be dual-polarized radiating elements 501, each column of vertical-dimensional feeding networks 303 are connected to an output port of the first horizontal-dimensional feeding network 502 and an output port of the second horizontal-dimensional feeding network 503. The first horizontal-dimensional feeding network 502 and the second horizontal-dimensional feeding network 503 adjust azimuths of radiated beams of the radiating elements 305, and the first horizontal-dimensional feeding network 502 and the second horizontal-dimensional feeding network 503 each have a plurality of input ports 306, which are respectively connected to the plurality of antenna ports 301, to form transceiver channels. The first horizontal-dimensional feeding network 502 has a switch, configured to change a quantity of input ends that are connected to output ends in the first horizontal-dimensional feeding network 502. The second horizontal-dimensional feeding network 503 has a switch, configured to change a quantity of input ends that are connected to output ends in the second horizontal-dimensional feeding network 503. It should be noted that the first horizontal-dimensional feeding network 502 and the second horizontal-dimensional feeding network 503 herein may be same horizontal-dimensional feeding networks, or may be different horizontal-dimensional feeding networks. The switches of the first horizontal-dimensional feeding network 502 and the second horizontal-dimensional feeding network 503 may be the same or different.

Based on the base station antenna 201 that uses the foregoing structure, four columns of antenna arrays 304 that include dual-polarized radiating elements 501 can form a maximum of eight transceiver channels by using the vertical-dimensional feeding network 303, the first horizontal-dimensional feeding network 502, the second horizontal-dimensional feeding network 503, and the antenna port 301. In addition, a quantity of formed transceiver channels may be reduced by using the switch of the first horizontal-dimensional feeding network 502 and the switch of the second horizontal-dimensional feeding network 503.

It should be noted that radiating elements in the antenna array 404 of the base station antenna 201 shown in FIG. 4 may also be set as dual-polarized radiating elements. In this case, the base station antenna 201 may have a structure shown in FIG. 6. Each dual-polarized radiating element 601 in the structure is connected to two horizontal-dimensional feeding networks 602, and a plurality of dual-polarized radiating elements located in a same row in the antenna array 404 are connected to a same horizontal-dimensional feeding network. Each horizontal-dimensional feeding network 602 is connected to a plurality of vertical-dimensional feeding networks 605, and dual-polarized radiating elements connected to any two horizontal-dimensional feeding networks that are connected to a same vertical-dimensional feeding network 605 are located in different rows of the antenna array 404. The dual-polarized radiating element 601 is connected to an output port 603 of the horizontal-dimensional feeding network 602, a plurality of input ports 604 of each horizontal-dimensional feeding network 602 are connected to a plurality of output ends 606 of the plurality of vertical-dimensional feeding networks 605, and each input end 607 of the vertical-dimensional feeding networks 605 is connected to a plurality of antenna ports 401.

Figure 6:
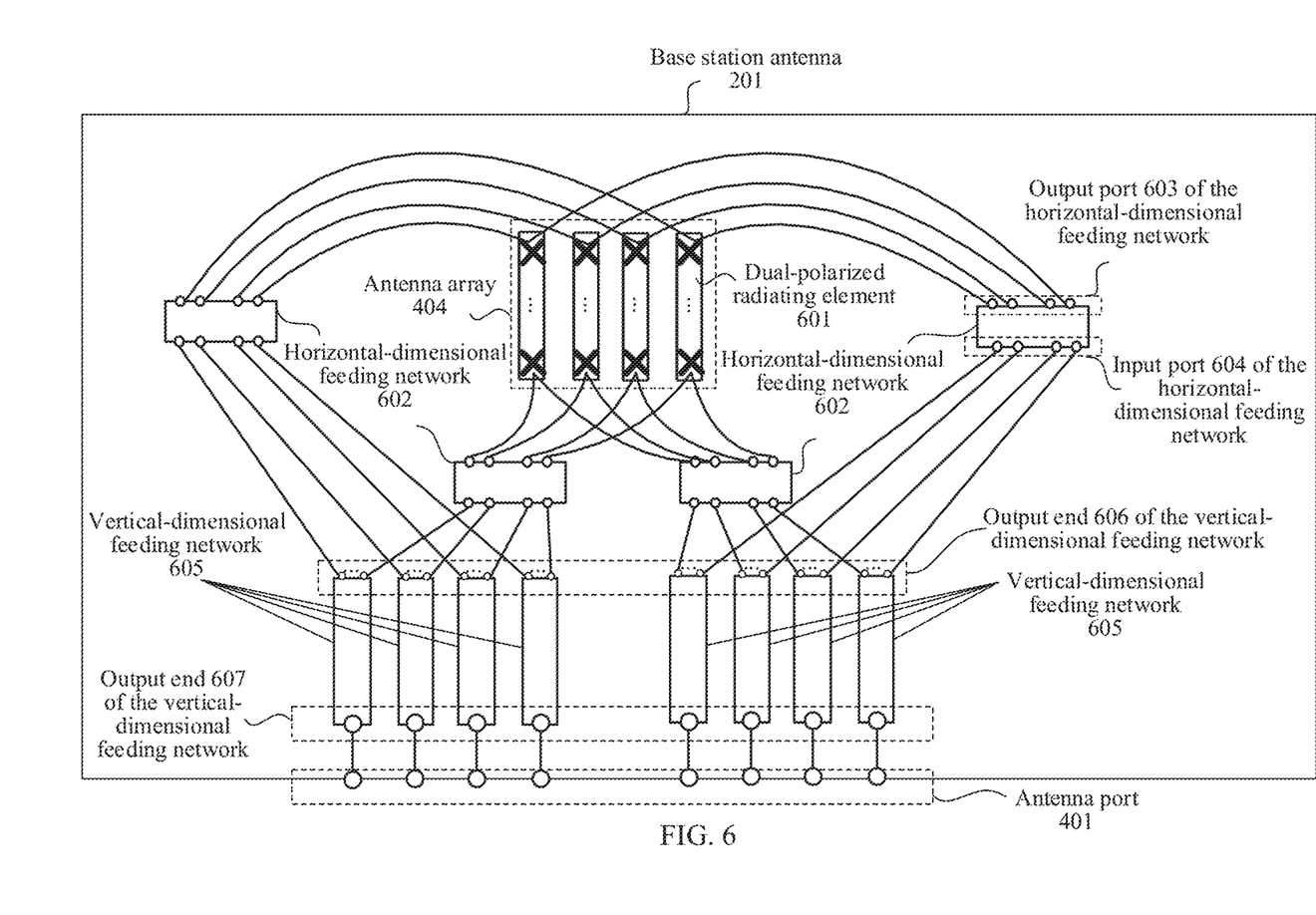
FIG. 6 is another schematic structural diagram of a base station antenna according to an embodiment of this application.

Based on the base station antenna 201 that uses the foregoing structure, four columns of antenna arrays 404 that include dual-polarized radiating elements 601 can form a maximum of eight transceiver channels by using the plurality of horizontal-dimensional feeding networks 602, the vertical-dimensional feeding networks 605, and the antenna ports 401. In addition, a quantity of formed transceiver channels may be reduced by using a switch of the horizontal-dimensional feeding network 602.

The following uses the horizontal-dimensional feeding network 302 shown in FIG. 3 as an example to describe a specific structure of the horizontal-dimensional feeding network provided in the embodiments of this application. It should be noted that a structure of the horizontal-dimensional feeding network is also applicable to the horizontal-dimensional feeding network 402 shown in FIG. 4.

Specifically, the horizontal-dimensional feeding network 302 may include m input ports and n output ports, where m is less than or equal to n, and m and n are positive integers. In this case, in each connection status, at least one of the m input ports is connected, by using a switch, to one or more output ports of the n output ports for feeding, to form a specific amplitude and phase, to feed the vertical-dimensional feeding network 303. In this case, there is a transceiver channel that can be actually used in an antenna port that is connected to each of the at least one input port. In different connection statuses, quantities of input ports connected to output ports of the horizontal-dimensional feeding network 302 are different, so that different horizontal-direction beam widths and shapes are implemented, to adapt to different systems.

Figure 7:
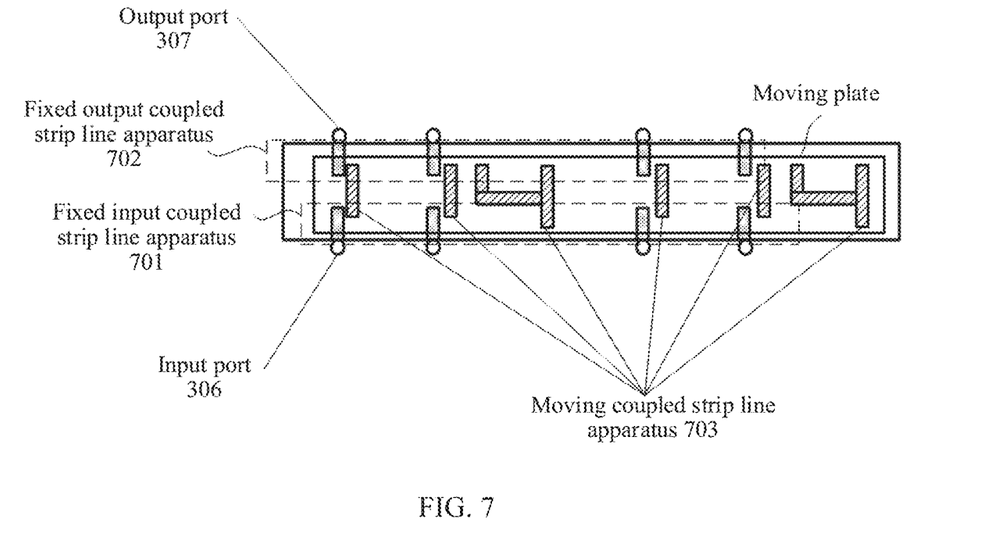
FIG. 7 is a schematic structural diagram of a switch according to an embodiment of this application.

In a feasible implementation, the switch in the embodiments of this application may have a structure shown in FIG. 7. It can be learned that in the structure, the switch includes fixed input coupled strip line apparatuses 701, fixed output coupled strip line apparatuses 702, and a moving coupled strip line apparatus 703, each input port 306 of the horizontal-dimensional feeding network is connected to one fixed input coupled strip line apparatus 701, and each output port 307 is connected to one fixed output coupled strip line apparatus 702 and each moving coupled strip line apparatus 703 includes at least one input end and at least one output end, and the at least one input end is connected to the at least one output end. In each connection status between the output port 307 and the input port 306, each fixed output coupled strip line apparatus 702 is connected to the output end of the moving coupled strip line apparatus 703, and each input end of each moving coupled strip line apparatus 703 connected to the fixed output coupled strip line apparatus 702 is connected to one fixed input coupled strip line apparatus 306. In this case, a path is formed between the fixed output coupled strip line apparatus 702 and the fixed input coupled strip line apparatus 306. The plurality of moving coupled strip line apparatuses 703 may be fixed on a same moving plate, and positions of the plurality of moving coupled strip line apparatuses 703 may be changed by translating the moving plate.

Figure 8A:
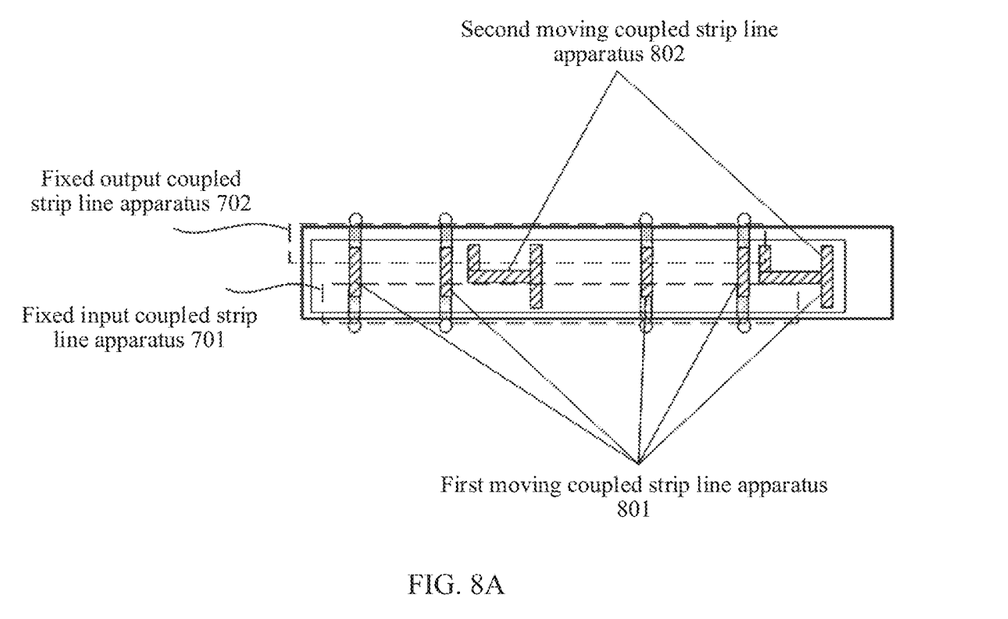
FIG. 8A is another schematic structural diagram of a switch according to an embodiment of this application.
Figure 8B:
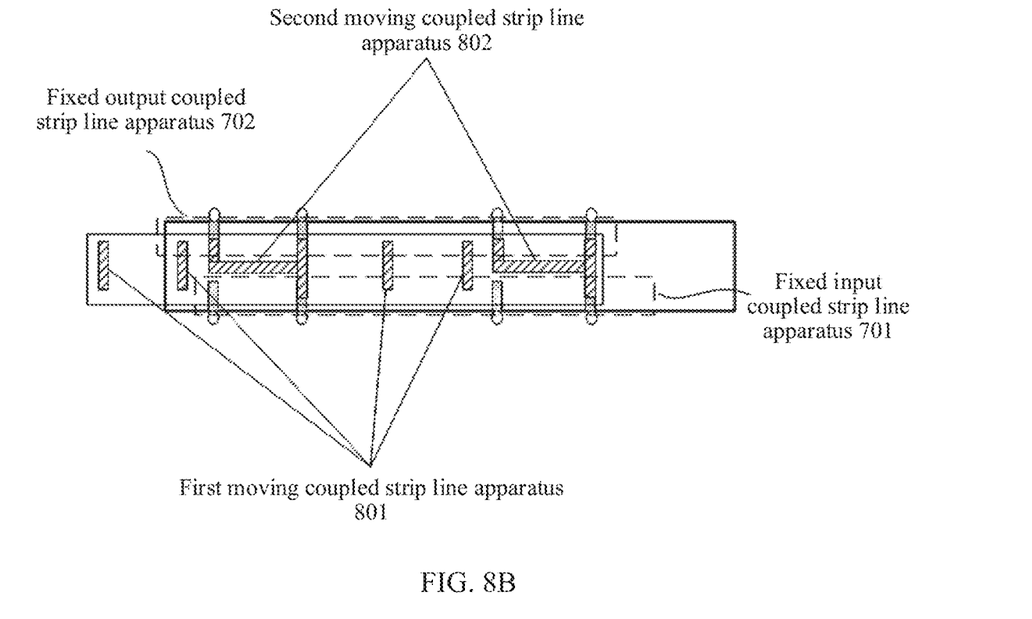
FIG. 8B is another schematic structural diagram of a switch according to an embodiment of this application.

For example, if the switch includes a first moving coupled strip line apparatus 801 and a second moving coupled strip line apparatus 802 shown in FIG. 8A and FIG. 8B, a sum of a quantity of input ends and a quantity of output ends of each first moving coupled strip line apparatus 801 is different from a sum of a quantity of input ends and a quantity of output ends of each second moving coupled strip line apparatus 802. A structure of the switch in a connected state is shown in FIG. 8A. Each fixed output coupled strip line apparatus 702 is connected to an output end of one first moving coupled strip line apparatus 801, each input end of each first moving coupled strip line apparatus 801 is connected to one fixed input coupled strip line apparatus 701, and a quantity of fixed input coupled strip line apparatuses 701 connected to the input ends of the first moving coupled strip line apparatus 801 is 4. In this case, a quantity of transceiver channels formed in the horizontal-dimensional feeding network in the connected state is 4.

A structure of the switch in another connected state is shown in FIG. 8B. Each fixed output coupled strip line apparatus 702 is connected to an output end of one second moving coupled strip line apparatus 802, each input end of each second moving coupled strip line apparatus 802 is connected to one fixed input coupled strip line apparatus 701, and a quantity of fixed input coupled strip line apparatuses 701 connected to the input ends of the second moving coupled strip line apparatus 802 is 2. In this case, a quantity of transceiver channels formed in the horizontal-dimensional feeding network in the connected state is 2.

The base station antenna 201 shown in FIG. 5 is used as an example. If both the switch of the first horizontal-dimensional feeding network 502 and the switch of the second horizontal-dimensional feeding network 503 of the base station antenna 201 are in the connected status shown in FIG. 8A, a quantity of transceiver channels formed in the base station antenna 201 is 8. In this case, the antenna ports 301 of the base station antenna 201 may be connected to eight TRXs, for example, connected to eight RRUs, to form an "eight-TX eight-RX structure". If both the switch of the first horizontal-dimensional feeding network 502 and the switch of the second horizontal-dimensional feeding network 503 are in the connected status shown in FIG. 8B, a quantity of transceiver channels formed in the base station antenna 201 is 4. In this case, the antenna ports 301 in communication with the antenna arrays 304 in the base station antenna 201 may be connected to four TRXs (for example, RRUs), to form a "four-TX four-RX structure".

For example, the switch may alternatively disconnect connections between all the fixed output coupled strip line apparatuses 702 and the output ports 307 of all the moving coupled strip line apparatuses 703, so that a horizontal-dimensional feeding network in which the switch is located is in a non-working state.

Figure 9:
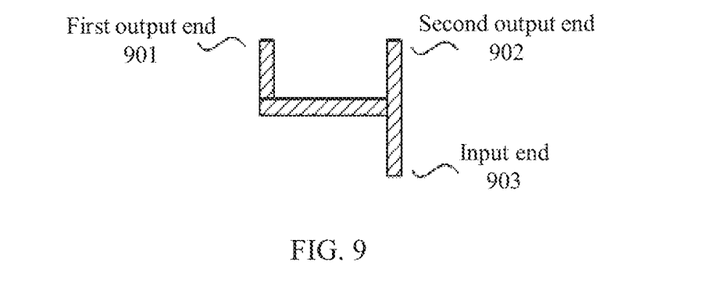
FIG. 9 is a schematic structural diagram of a moving coupled strip line apparatus according to an embodiment of this application.
Figure 10:
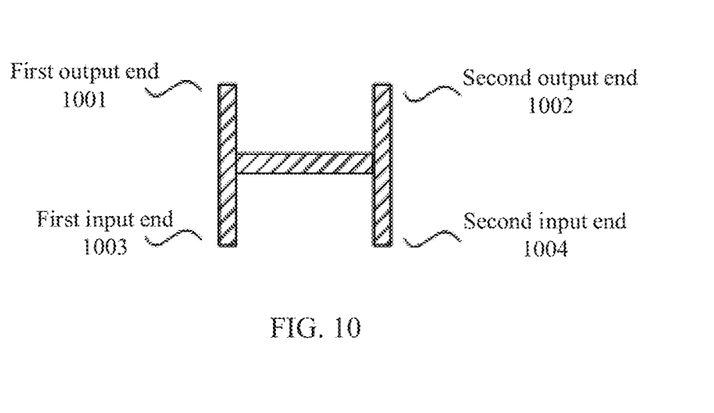
FIG. 10 is another schematic structural diagram of a moving coupled strip line apparatus according to an embodiment of this application.

It should be understood that structures of the first moving coupled strip line apparatus and the second moving coupled strip line apparatus in the embodiments of this application are not limited to two-port structures in which there is one output end and there is one input end, as shown in FIG. 8A and FIG. 8B. For example, alternatively, the first moving coupled strip line apparatus may be of a three-port structure shown in FIG. 9. The three ports are a first output end 901, a second output end 902, and an input end 903. The first moving coupled strip line apparatus may alternatively be of a four-port structure shown in FIG. 10. The four ports are a first output end 1001, a second output end 1002, a first input end 1003, and a second input end 1004. The foregoing structures of the first moving coupled strip line apparatus are merely examples for description. On a premise that implementation of this application is not affected, the first moving coupled strip line apparatus may also use another structure.

For example, the first moving coupled strip line apparatus includes more than two input ends and more than two output ends.

In addition, the second moving coupled strip line apparatus is not limited to the three-port structure with two output ends and one input end shown in FIG. 8A and FIG. 8B, and may further have another implementation. For example, the second moving coupled strip line apparatus may alternatively be a two-port structure with one output end and one input end, or the second moving coupled strip line apparatus may alternatively be of a four-port structure shown in FIG. 10. The four ports are a first output end 1001, a second output end 1002, a first input end 1003, and a second input end 1004. Moreover, a second moving coupled strip line apparatus of another structure may also be used on a premise that the implementation of this application is not affected. For example, the second moving coupled strip line apparatus includes more than two input ends and more than two output ends.

The following uses the switches shown in FIG. 8A and FIG. 8B as an example to describe a manner in which a switch switches the connection status between the output port 307 and the input port 306 of the horizontal-dimensional feeding network.

If the switch is currently in the state shown in FIG. 8A, at least one first moving coupled strip line apparatus 801 and at least one second moving coupled strip line apparatus 802 may be moved, so that output ends of the at least one first moving coupled strip line apparatus 801 are connected to a target fixed output coupled strip line apparatus, where the target fixed output coupled strip line apparatus is a part of all fixed output coupled strip line apparatuses; each target fixed output coupled strip line apparatus is connected to one output end of the second moving coupled strip line apparatus 802; and the output ends and input ends of the second moving coupled strip line apparatus 802 connected to the target fixed output coupled strip line apparatus are connected to one fixed input coupled strip line apparatus 701.

For example, if target fixed output coupled strip lines are all fixed output coupled strip line apparatuses 702, at least one first moving coupled strip line apparatus 801 and at least one second moving coupled strip line apparatus 802 may be moved, so that output ends of the at least one first moving coupled strip line apparatus 801 are disconnected from all fixed output coupled strip line apparatuses 702; each fixed output coupled strip line apparatus 702 is connected to one output end of the second moving coupled strip line apparatus 802; and the output ends and input ends of the second moving coupled strip line apparatus 802 connected to the fixed output coupled strip line apparatus 702 are connected one fixed input coupled strip line apparatus 701, to form the state shown in FIG. 8B. In the state shown in FIG. 8A, a total quantity of input ends connected to the fixed input coupled strip line apparatus 701 is 4, which is different from a total quantity, that is, 2, of input ends connected to the fixed input coupled strip line apparatus 701 in the state shown in FIG. 8B.

In an implementation, a part or all of the first moving coupled strip line apparatuses 801 and a part or all of the second moving coupled strip line apparatuses 802 may be fixed on a same moving plate, and the moving plate is translated in a manual or electronic control manner to move the at least one first moving coupled strip line apparatus 801 and the at least one second moving coupled strip line apparatus 802, to implement the foregoing manner of switching, the connection status between the output port 307 and the input port 306. In an implementation, the fixed output coupled strip line apparatus 702, the fixed input coupled strip line apparatus 701, and the moving coupled strip line apparatus 703 shown in FIG. 7 may be manufactured on a printed circuit board (printed circuit board, PCB). All the first moving coupled strip line apparatuses 801 and all the second moving coupled strip line apparatuses 802 may be manufactured on a same PCB board, and the PCB board is used as a moving board. When the PCB board is moved, all the first moving coupled strip line apparatuses 801 and all the second moving coupled strip line apparatuses 802 are moved.

For example, in the base station antenna 201, spacings between columns of radiating elements in an antenna array may be equal. In this case, the antenna array may be an array with an equal spacing, or the antenna array may be an array with spacings that are not equal. During implementation, spacings between columns of radiating elements in an antenna array are less than or equal to a spacing threshold d. A value of d may be less than or equal to 0.6 times a wavelength of a center frequency of an operating frequency band.

Based on a same inventive concept, an embodiment of this application further provides a base station device, including the base station antenna provided in the embodiments of this application and a plurality of TRXs. The plurality of TRXs are in one-to-one connection with a plurality of antenna ports in the base station antenna.

For example, the TRXs in the base station device may be RRUs.

Figure 11:
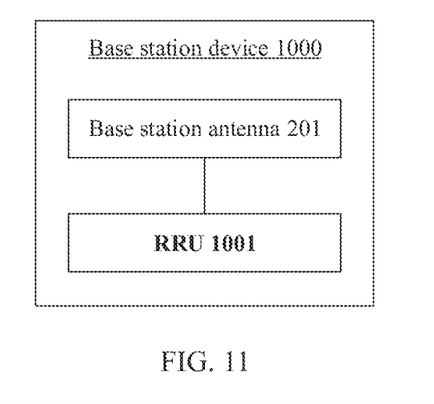
FIG. 11 is another schematic structural diagram of a base station antenna according to an embodiment of this application.

As shown in FIG. 11, a base station device 1000 provided in an embodiment of this application may include the base station antenna 201 and a plurality of RRUs 1001. Each RRU 1001 is connected to one antenna port of the base station antenna 201. Because the horizontal-dimensional feeding network of the base station antenna 201 provided in the embodiments of this application has a switch, which may be configured to change a connection status between an output port and an input port. In each connection status, each output port is connected to at least one input port, and quantities of input ports connected to a plurality of output ports in any two connection statuses are different. In this case, the base station device 1000 having this structure supports changing a quantity of transceiver channels without replacing the base station antenna.

In a feasible implementation, each RRU 1001 may be connected to an antenna port that is in communication with an array antenna and that is in the base station antenna 201, and a quantity of the RRUs 1001 is the same as a quantity of antenna ports that are in communication with the array antennas and that are in the base station antenna 201. Therefore, the quantity of the RRUs 1001 may be flexibly increased or reduced based on a use requirement of transceiver channels.

For example, the base station antenna 201 in the base station device 1000 may have the structure shown in FIG. 3, FIG. 4, FIG. 5, or FIG. 6, and the switch in the base station antenna 201 may have the structure shown in FIG. 7, FIG. 8A, FIG. 8B, FIG. 9, or FIG. 10.

Figure 12:
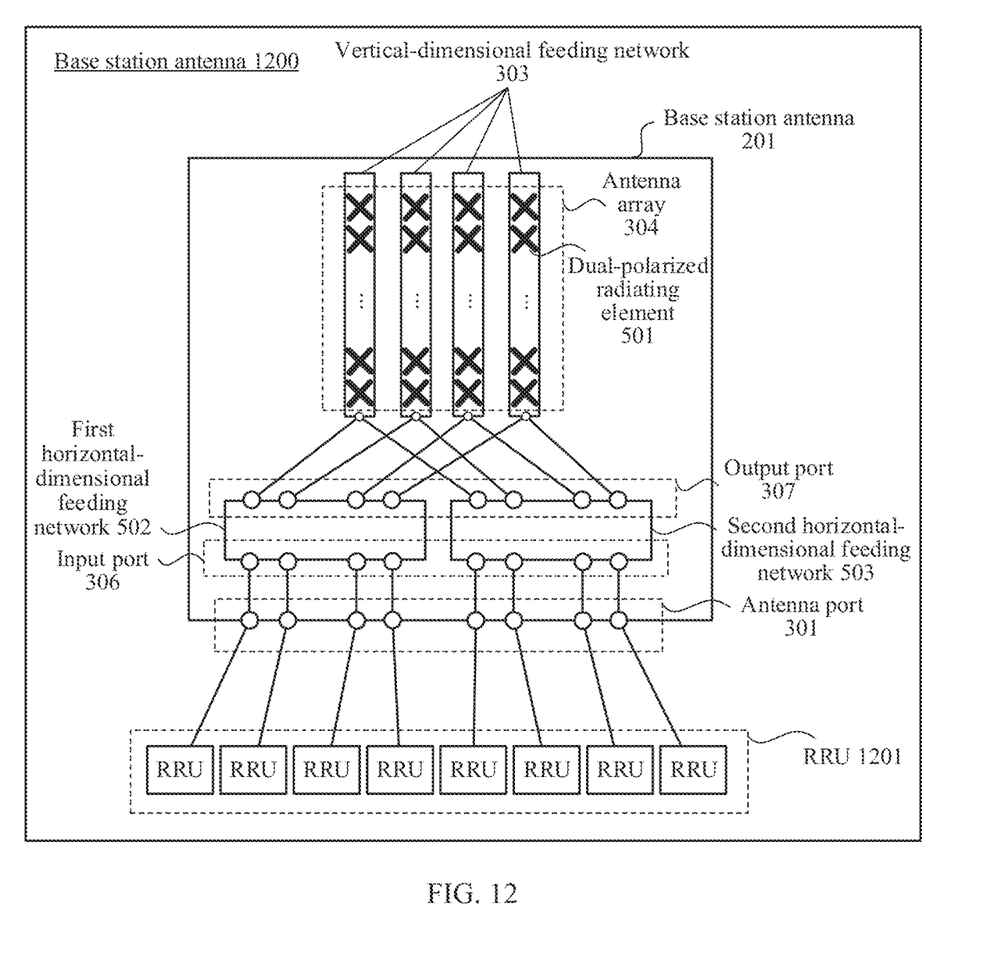
FIG. 12 is yet another schematic structural diagram of a base station antenna according to an embodiment of this application.

For example, a structure of the base station device 1000 provided in this embodiment of this application is shown in FIG. 12. The base station device 1000 includes the base station antenna 201 provided in the embodiments of this application and RRUs 1201. A quantity of the RRUs 1201 is the same as a quantity of antenna ports 301 of the base station antenna 201, and a plurality of RRUs 1201 are in one-to-one connection with a plurality of antenna ports 301. As the switch of the first horizontal-dimensional feeding network 502 may change a quantity of input ports 306 that are connected to the output ports 307 in the first horizontal-dimensional feeding network 502, and the switch of the second horizontal-dimensional feeding network 503 may change a quantity of input ports 306 that are connected to the output ports 307 in the second horizontal-dimensional feeding network 503, a quantity of transceiver channels formed in the base station antenna 201 shown in FIG. 12 may change based on an actual use requirement. In an implementation, when an antenna port 301 is not used (that is, an input port 306 connected to the antenna port 301 is not connected to any output port 307), the RRU 1201 connected to the antenna port 301 may be in a non-working state; or connection between the RRU and the antenna port 301 may be disconnected.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some possible embodiments of this application have been described, persons skilled in the art can make changes and modifications to these embodiments once they learn the basic inventive concept. Therefore, the following is intended to be construed as to cover the embodiments of this application and all changes and modifications falling within the scope of this application.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A base station antenna, comprising a plurality of antenna ports, a horizontal-dimensional feeding network, a plurality of vertical-dimensional feeding networks, and a plurality of columns of antenna arrays, wherein each column of antenna arrays comprise a plurality of radiating elements, and wherein each vertical-dimensional feeding network feeds all radiating elements in one of the plurality of columns of antenna arrays;
   wherein the horizontal-dimensional feeding network comprises a plurality of input ports, a plurality of output ports, and a switch, wherein:
      the switch is configured to switch a connection status between the output port and the input port;
      in each connection status, each output port is connected to at least one input port; and
      quantities of input ports connected to the plurality of output ports in any two connection statuses are different;
   wherein the plurality of input ports are in one-to-one connection with the plurality of antenna ports, and wherein the antenna port is configured to:
      send a first signal to an input port connected to the antenna port; and
      receive a second signal from the input port connected to the antenna port; and
   wherein each output port is connected to one vertical-dimensional feeding network.

2. The base station antenna according to claim 1, wherein the switch comprises fixed input coupled strip line apparatuses, fixed output coupled strip line apparatuses, and at least one moving coupled strip line apparatus, wherein each input port is connected to one fixed input coupled strip line apparatus, and wherein each output port is connected to one fixed output coupled strip line apparatus; and
   wherein each moving coupled strip line apparatus comprises at least one input end and at least one output end, and the at least one input end is connected to the at least one output end, wherein:
      in each connection status, each fixed output coupled strip line apparatus is connected to one output end of the moving coupled strip line apparatus, and each input end of each moving coupled strip line apparatus connected to the fixed output coupled strip line apparatus is connected to one fixed input coupled strip line apparatus.

3. The base station antenna according to claim 2, wherein the moving coupled strip line apparatus comprises a first moving coupled strip line apparatus and a second moving coupled strip line apparatus, and wherein a sum of a quantity of input ends and a quantity of output ends of the first moving coupled strip line apparatus is different from a sum of a quantity of input ends and a quantity of output ends of the second moving coupled strip line apparatus; and
   wherein the switch is configured to switch the connection status between the output port and the input port in the following manner:
      moving at least one first moving coupled strip line apparatus and at least one second moving coupled strip line apparatus to disconnect an output end of the at least one first moving coupled strip line apparatus from a target fixed output coupled strip line apparatus, to connect each target fixed output coupled strip line apparatus to an output end of the at least one second moving coupled strip line apparatus, and to connect each input end of the at least one second moving coupled strip line apparatus to a fixed input coupled strip line apparatus, wherein:

a total quantity of input ends of the at least one first moving coupled strip line apparatus is different from a total quantity of input end of the at least one second moving coupled strip line apparatus; and the target fixed output coupled strip line apparatus is at least one of all the fixed output coupled strip line apparatuses.

4. The base station antenna according to claim 3, wherein:
if the quantity of output ends of each first moving coupled strip line apparatus is 1 and the quantity of input ends is 1,
the quantity of output ends of each second moving coupled strip line apparatus is 2 and the quantity of input ends is 1; or
the quantity of output ends of each second moving coupled strip line apparatus is 2 and the quantity of input ends is 2;
if the quantity of output ends of each first moving coupled strip line apparatus is 2 and the quantity of input ends is 1,
the quantity of output ends of each second moving coupled strip line apparatus is 1 and the quantity of input ends is 1; or
the quantity of output ends of each second moving coupled strip line apparatus is 2 and the quantity of input ends is 2; or
if the quantity of output ends of each first moving coupled strip line apparatus is 2 and the quantity of input ends is 2,
the quantity of output ends of each second moving coupled strip line apparatus is 1 and the quantity of input ends is 1; or
the quantity of output ends of each second moving coupled strip line apparatus is 2 and the quantity of input ends is 1.

5. The base station antenna according to claim 1, wherein at least one of the plurality of radiating elements comprised in the plurality of columns of antenna array is a dual-polarized radiating element.

6. The base station antenna according to claim 1, wherein a quantity of the columns of antenna arrays is greater than or equal to 4.

7. The base station antenna according to claim 1, wherein each vertical-dimensional feeding network is a phase-shift network, and wherein the phase-shift network is used to adjust a downtilt angle of a beam.

8. A base station antenna, comprising a plurality of antenna ports, a plurality of horizontal-dimensional feeding networks, a plurality of vertical-dimensional feeding networks, and a plurality of rows of antenna arrays, wherein each row of antenna arrays comprise a plurality of radiating elements;
wherein each horizontal-dimensional feeding network comprises a plurality of input ports, a plurality of output ports, and a switch, wherein:
the switch is configured to switch a connection status between the output port and the input port of the horizontal-dimensional feeding network;
in each connection status, each output port is connected to at least one input port; and
quantities of input ports connected to the plurality of output ports in any two connection statuses are different;
wherein the plurality of output ports are in one-to-one connection with a plurality of radiating elements in one row of antenna arrays;
wherein each input port is connected to an output end of a vertical-dimensional feeding network; and
wherein input ends of the plurality of vertical-dimensional feeding networks are in one-to-one connection with the plurality of antenna ports.

9. The base station antenna according to claim 8, wherein the switch comprises fixed input coupled strip line apparatuses, fixed output coupled strip line apparatuses, and at least one moving coupled strip line apparatus, wherein each input port is connected to one fixed input coupled strip line apparatus, and wherein each output port is connected to one fixed output coupled strip line apparatus; and
wherein each moving coupled strip line apparatus comprises at least one input end and at least one output end, and wherein the at least one input end is connected to the at least one output end, wherein:
in each connection status, each fixed output coupled strip line apparatus is connected to one output end of the moving coupled strip line apparatus, and each input end of each moving coupled strip line apparatus connected to the fixed output coupled strip line apparatus is connected to one fixed input coupled strip line apparatus.

10. The base station antenna according to claim 9, wherein the moving coupled strip line apparatus comprises a first moving coupled strip line apparatus and a second moving coupled strip line apparatus, and wherein a sum of a quantity of input ends and a quantity of output ends of the first moving coupled strip line apparatus is different from a sum of a quantity of input ends and a quantity of output ends of the second moving coupled strip line apparatus; and
wherein the switch is configured to switch the connection status between the output port and the input port in the following manner:
moving at least one first moving coupled strip line apparatus and at least one second moving coupled strip line apparatus to disconnect an output end of the at least one first moving coupled strip line apparatus from a target fixed output coupled strip line apparatus, to connect each target fixed output coupled strip line apparatus to an output end of the at least one second moving coupled strip line apparatus, and to connect each input end of the at least one second moving coupled strip line apparatus to a fixed input coupled strip line apparatus, wherein:
a total quantity of input ends of the at least one first moving coupled strip line apparatus is different from a total quantity of input end of the at least one second moving coupled strip line apparatus; and
the target fixed output coupled strip line apparatus is at least one of all the fixed output coupled strip line apparatuses.

11. The base station antenna according to claim 10, wherein:
if the quantity of output ends of each first moving coupled strip line apparatus is 1 and the quantity of input ends is 1,
the quantity of output ends of each second moving coupled strip line apparatus is 2 and the quantity of input ends is 1; or
the quantity of output ends of each second moving coupled strip line apparatus is 2 and the quantity of input ends is 2;
if the quantity of output ends of each first moving coupled strip line apparatus is 2 and the quantity of input ends is 1, the quantity of output ends of each second moving coupled strip line apparatus is 1 and the quantity of input ends is 1; or the quantity of output ends of each second moving coupled strip line apparatus is 2 and the quantity of input ends is 2; or if the quantity of output ends of each first moving coupled strip line apparatus is 2 and the quantity of input ends is 2, the quantity of output ends of each second moving coupled strip line apparatus is 1 and the quantity of input ends is 1; or the quantity of output ends of each second moving coupled strip line apparatus is 2 and the quantity of input ends is 1.

12. The base station antenna according to claim 8, wherein at least one of the plurality of radiating elements comprised in the antenna arrays is a dual-polarized radiating element.

13. The base station antenna according to claim 8, wherein a quantity of columns of the antenna arrays is greater than or equal to 4.

14. The base station antenna according to claim 8, wherein each vertical-dimensional feeding network is a phase-shift network, and wherein the phase-shift network is used to adjust a downtilt angle of a beam.

15. A switch, comprising fixed input coupled strip line apparatuses, fixed output coupled strip line apparatuses, and a moving coupled strip line apparatus, wherein:

when the moving coupled strip line apparatus moves to be connected to the fixed input coupled strip line apparatus and the fixed output coupled strip line apparatus, the switch is in a connected state; and when the moving coupled strip line apparatus moves to be disconnected to the fixed input coupled strip line apparatus, or when the moving coupled strip line apparatus moves to be disconnected to the fixed output coupled strip line apparatus, the switch is in a disconnected state.

16. A base station device, comprising the base station antenna according to claim 1 and a plurality of transceivers, wherein the plurality of transceivers are in one-to-one connection with a plurality of antenna ports.

17. The base station device according to claim 16, wherein the transceiver is a remote radio unit (RRU).

18. A base station device, comprising the switch according to claim 9, wherein the plurality of transceivers are in one-to-one connection with a plurality of antenna ports.

19. The base station device according to claim 16, wherein the transceiver is a remote radio unit (RRU).

20. A base station device, comprising the base station antenna according to claim 8 and a plurality of transceivers, wherein the plurality of transceivers are in one-to-one connection with a plurality of antenna ports.

21. The base station device according to claim 16, wherein the transceiver is a remote radio unit (RRU).

* * * * *

UNITED STATES PATENT AND TRADEMARK OFFICE
CERTIFICATE OF CORRECTION

PATENT NO. : 11,342,654 B2
APPLICATION NO. : 17/158674
DATED : May 24, 2022
INVENTOR(S) : Weihong Xiao and Zhiqiang Liao It is certified that error appears in the above-identified patent and that said Letters Patent is hereby corrected as shown below:

In the Specification

Column 1/Line 7 (Approx.) - Delete "international" and insert -- International --.

Column 1/Line 8 (Approx.) - Delete "PCT/CN2019/0971412," and insert -- PCT/CN2019/097142, --.

Signed and Sealed this
Twenty-fifth Day of October, 2022

Katherine Kelly Vidal
Director of the United States Patent and Trademark Office